United States Patent Office 3,383,882
Patented May 21, 1968

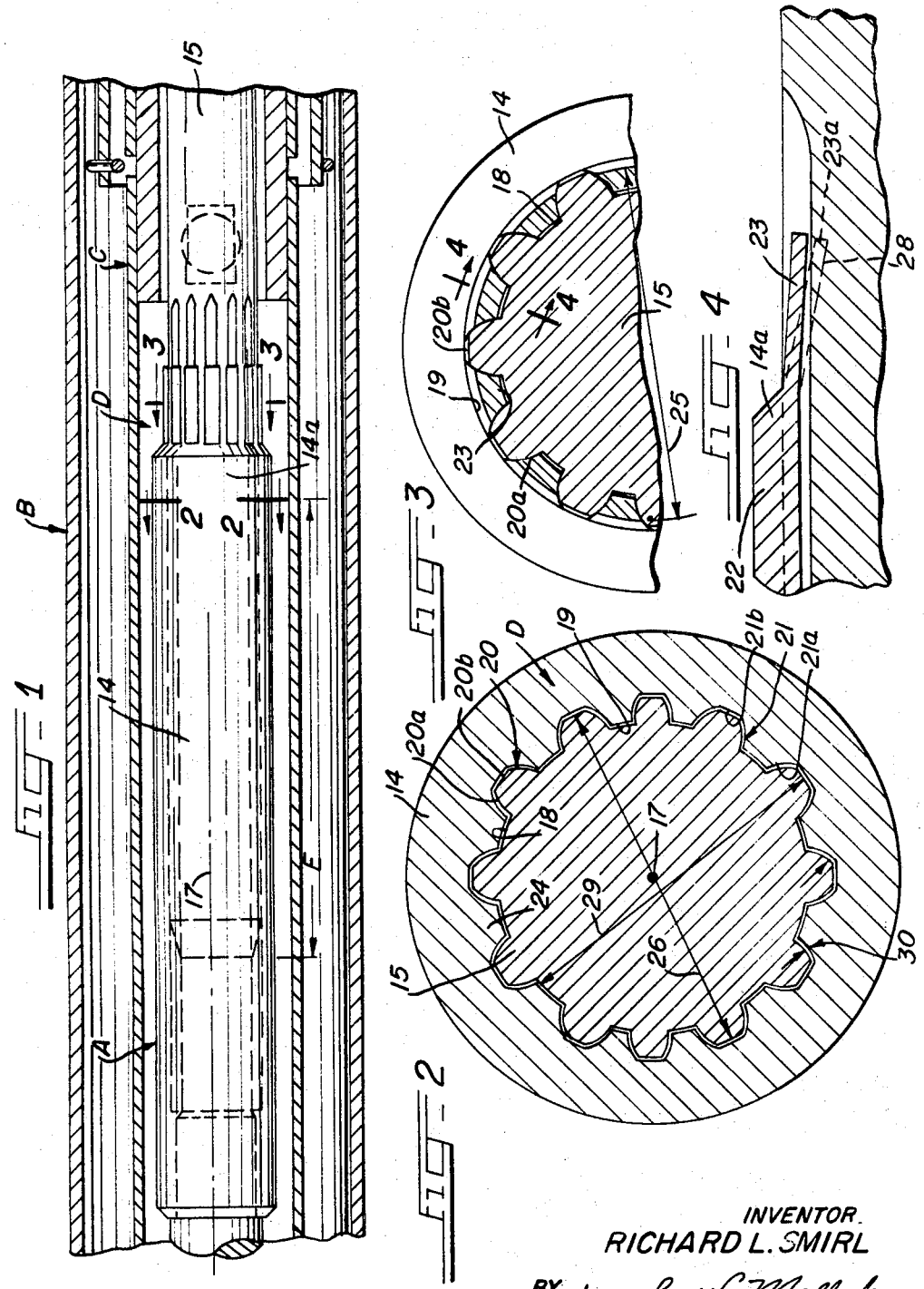

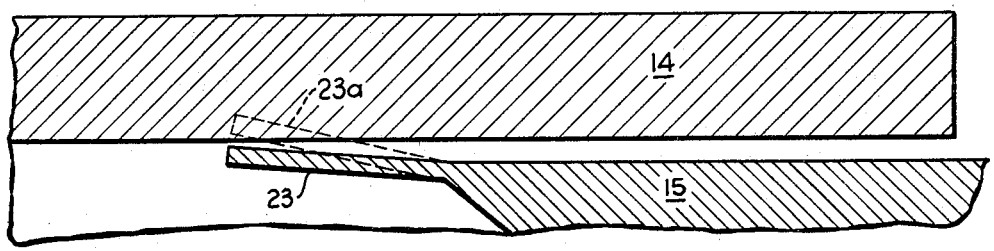

3,383,882
ADJUSTABLE STEERING COLUMN EMPLOYING ANTI-BACKLASH SLIP JOINT
Richard L. Smirl, La Grange Park, Ill., assignor to Borg-Warner Corporation, Chicago, Ill., a corporation of Illinois
Filed Dec. 15, 1965, Ser. No. 514,027
8 Claims. (Cl. 64—23)

ABSTRACT OF THE DISCLOSURE

A slip joint of the kind used to couple a driving shaft with a driven shaft and allow relative axial motion therebetween including means to eliminate rotary backlash between the shafts.

---

The present invention relates to tubular articles of manufacture. The improvement contemplated herein is particularly directed to a splined connection between one member and a surrounding tube for use in an assembly wherein two members are adapted for axial movement with respect to each other while providing for rotary drive. For example, the article may preferably be part of an automotive steering linkage which requires a high degree of accurate turning response, or the articles may be employed as part of a clutch assembly or for cooperation with a universal joint in connection with a propeller or transmission shaft in a mechanical power drive.

In certain applications rotary backlash or free-play must be substantially reduced or eliminated. This is particularly true in automotive steering columns which are now being adapted for telescoping or retracting movement. The slip joints used to interconnect the telescoping members must be without angular free-play when steering movement is involved.

It is therefore a primary object of this invention to provide an improved slip joint which incorporates economical anti-backlash structure.

Other objects and advantages of this invention will become more apparent from the following detailed description taken in connection with the accompanying drawings in which:

FIGURE 1 is a central sectional view of structure having a telescoping steering linkage and embodying the principles of this invention;

FIGURE 2 is an enlarged sectional view of a portion of the structure of FIGURE 1 and taken substantially along line 2—2 thereof;

FIGURE 3 is another enlarged sectional view taken substantially along line 3—3 of FIGURE 1;

FIGURE 4 is a fragmentary view taken substantially along line 4—4 of FIGURE 3; and FIGURE 5 is a fragmentary view taken substantially along line 4—4 of FIGURE 3.

Turning now to the drawings and more particularly to FIGURE 1, the slip joint broadly designated D, is illustrated as embodied within a retractable steering column for a vehicle (only part of which is shown) and which is more particularly described in U.S. application Ser. No. 512,292 filed Dec. 8, 1965.

The particular slip joint herein is useful for providing an anti-backlash slip connection within the central steering linkage A. The linkage A is supported by an outer tubular jacket B which is fixed against movement both rotationally and longitudinally; between the outer jacket and the central steering linkage is interposed telescoping shift tube assembly C supported in part by sleeve bushing 11. In this application, the end of one part of the steering linkage is capable of longitudinally telescoping or retracting between the extreme positions indicated by E. In any of the intermediate positions as well as the extreme positions, the steering linkage must be capable of transmitting rotary drive with complete response between the members so as not to affect steering "feel."

The steering linkage A particularly comprises a first member or outer cylinder 14 within which is received a central shaft or second member 15. The cylinders are related together by the splined slip connection D. Means D comprises a plurality of circumferentially arranged male splines 20 projecting radially outwardly from an exterior cylindrical surface 18 of member 15. The splines 20 extend longitudinally and parallel to the central axis 17 of steering movement and are adapted for being interleaved with and received by a plurality of circumferentially spaced female splines 21 formed in the interior cylindrical surface 19 or the outer member 14. The female splines 21 constitute grooves separated by lands 24 which are oppositely and complementary to the male splines 20. Although the female splines or grooves and the male splines or projections are not in mirror images, this invention encompasses splines of any shape, identical or not, provided they mate for rotary drive.

The male splines 20 each have opposite longitudinally extending sides 20a which are also generally radially directed in their transverse extent tending to converge outwardly with respect to the axis 17 thereof. Each radially outermost portion of the male splines are defined by a flat surface 20b forming a crest; the remaining portion of surface 18 between the projections 20 form valleys. The female splines or grooves 21 interrupt the surface 19 and each have longitudinal extending sides 21a which are also generally radially directed in their transverse extent; sides 21a complementary in shape to the sides 20a of the male splines and are provided with valleys or bottom flats 20b.

The longitudinal extent of each female spline 21 may be subdivided into a first portion 22 (see FIGURE 4), which is embraced by the annular body or tube of member 14, and a second portion 23 constituting resilient fingers extending outwardly or longitudinally from one end 14a thereof. The fingers may preferably be formed by a process whereby the end 14a of member 14 has the material of the body or tube adjacent thereto removed to a diameter 25 which is slightly less than the diameter 26 formed by the bottom flats 21b of the female splines or grooves 21. The fingers thereby constitute residual material from the removal steps and are free to flex or be bent inwardly towards the longitudinal axis 17 without constraint by the member's body. The fingers may be given a preformed condition extremities 23a spaced slightly inwardly of the diameter 29 formed by the male spline flats 20b; and result in a condition 28 shown in broken outline in FIGURE 4. Upon assemblage of the member 14 and 15, the resilient fingers are flexed slightly outwardly by contact with the male splines and assume a position shown in full line in FIGURE 4. The resulting effect is that the radially directed sides 21a carried by the fingers tend to resiliently wedge against the sides 20a of the male splines and dimensional tolerances or slack 30 therebetween is substantially eliminated thus relieving the members 14 and 15 of backlash.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit. For example, the members 14 and 15 may each have fingers extending resiliently toward the other member, or the inner shaft may be the sole member provided with the resilient fingers (see FIGURE 5) in contradistinction to the preferred embodiment.

I claim:

1. A slip joint, comprising: first and second members; means for relating said members together for providing a driving relationship about a first axis and for permitting relative sliding movement therebetween along said axis, said means comprising at least one pair of converging surfaces on each of said members, said first member having a projection provided with a rigid portion carrying a part of said surfaces associated therewith and a resilient finger formed integral with said first member carrying the other part of said surfaces, said second member rigidly carrying said surfaces associated therewith and having said second member surfaces complementary in shape to mate with the first member surfaces, said resilient finger being resiliently biased into engagement with said second member in a manner so that the converging surfaces carried thereon tend to wedgingly engage the converging surfaces carried by said second member whereby dimensional slack between said surfaces is substantially eliminated.

2. A slip joint as in claim 1, in which said members are arranged concentrically one within the other and adapted for telescoping sliding movement along one common axis thereof, said relating means being more particularly comprised of a plurality of projections and accompanying fingers formed on said first member, and said second member having a plurality of openings carrying said surfaces for receiving said projections and fingers.

3. A slip joint comprising: male and female members drivingly connected together for rotation with freedom for slip movement along a longitudinal axis thereof, said connection being provided by circumferentially arranged longitudinal splines on each of said members and interleaved together for providing a rotary driving relationship, said male member having at least one flexible finger extending outwardly from one end thereof and being biased slightly radially outward from the longitudinal axis whereby said finger may resiliently wedge against the sides of the splines of said female member to take up dimensional play for substantially eliminating angular slack between the members.

4. A slip joint as in claim 3, in which the radially directed sides of said splines of the male member are curved tending to converge beyond the periphery of said male member.

5. A slip joint, comprising: an outer cylinder having an inner peripheral surface, a center cylinder telescopingly received within said outer cylinder and having an outer peripheral surface, longitudinally directed splines formed on the respective surfaces of said members and adapted for being interleaved to provide a rotative drive therebetween while permitting longitudinal slip, the sides of said splines being generally radially directed and the splines of one of said cylinders extending longitudinal beyond the terminal end thereof and having a biased portion to flexibly engage the sides of the other member splines to resiliently take up rotary slack between said cylinders.

6. A slip joint as in claim 5, in which the sides of said splines are generally semi-spherical in configuration with the splines of one cylinder being complementary in shape to the splines of the other cylinder.

7. A slip joint as in claim 5, in which the biased portion of the splines are carried by the outer cylinder and are biased in a direction toward the central axis thereof whereby the sides of said biased splines tend to wedgingly engage the sides of the central cylinder splines.

8. A slip joint comprising: male and female members drivingly connected together for rotation with freedom for slip movement along a longitudinal axis thereof, said connection being provided by circumferentially arranged longitudinal splines on each of said members and interleaved together for providing a rotary driving relationship, said female member having at least one flexible finger extending outwardly from one end thereof and being biased slightly toward the longitudinal axis whereby said finger may resiliently wedge against the sides of the splines of said male member to take up dimensional play for substantially eliminating angular slack between the members.

References Cited

UNITED STATES PATENTS

| | | | |
|---|---|---|---|
| 2,441,038 | 5/1948 | Siesel | 64—29 |
| 2,587,838 | 3/1952 | Green | 287—53 |
| 2,861,437 | 11/1958 | Bachman | 64—15 |
| 2,934,919 | 5/1960 | Barta et al. | 64—23 |
| 3,142,973 | 8/1964 | Evans et al. | 64—1 |

FOREIGN PATENTS 977,883   12/1964   Great Britain.

HALL C. COE, *Primary Examiner.*